Nov. 21, 1944.  D. W. WITKIN  2,363,454
CABINET
Filed July 2, 1943
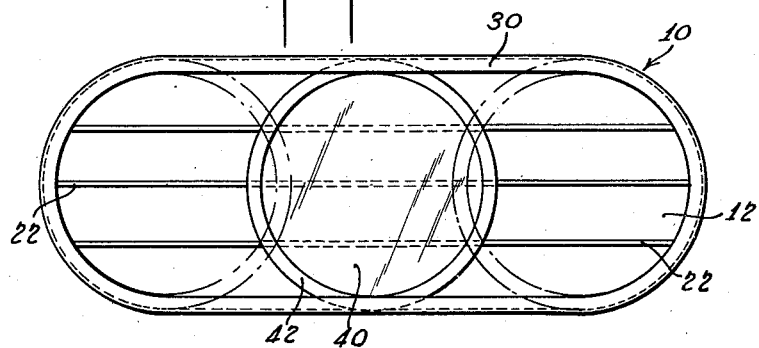
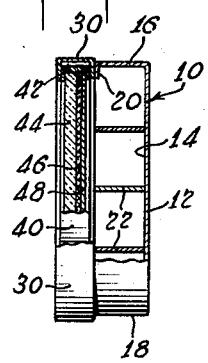
INVENTOR.
DANIEL W. WITKIN
BY Schames and Liberman
ATTORNEYS Patented Nov. 21, 1944

2,363,454

UNITED STATES PATENT OFFICE 2,363,454

CABINET

Daniel W. Witkin, Brooklyn, N. Y.

Application July 2, 1943, Serial No. 493,310

1 Claim. (Cl. 312—189)

My invention relates to cabinets and closures therefor, and in particular, it relates to closures which operate in a plane parallel to and coincident with the plane of the cabinet opening.

The main object of my invention is the provision of an elongated cabinet, horizontally disposed, having an opening thereinto, and a rolling closure therefor adapted to reciprocate in the plane of the opening, the closure being of such size as to permit access to all parts of the cabinet interior.

Another object of my invention is the provision of a cabinet having curved ends and a rolling closure therefor which is similarly curved to fit the curved ends of the cabinet.

Another object of my invention is the provision of a cabinet having an opening thereinto defined by a channelled frame extending around the said opening, and a closure therefor fitting within said channeled frame adapted to be rolled back and forth therealong.

Still another object of my invention is the provision of a cabinet having an opening, and a closure for said opening, the closure being circular in shape, and rollable back and forth across said opening.

Still another object of my invention is the provision of a cabinet having a horizontally disposed opening, the ends of which are semi-circularly shaped, and a circular closure for said opening, the opening being at least twice as wide as the closure.

Further objects of my invention will be apparent from the following description of an illustrative embodiment, and still others will be specifically pointed out hereinbelow.

Referring to the drawing, Figure 1 is a front elevation of my cabinet and Figure 2 is a side elevation partly in section. My device is indicated generally by reference numeral 10 and comprises an elongated casing 12, which may be formed by stamping or otherwise of metal, wood or the like. A number of shelves, as 22, 22 may be provided inside the cabinet, secured to rear wall 14 and the end walls, extending lengthwise of the casing.

As seen in Fig. 2, casing 12 comprises a rear wall 14, top and bottom walls 16, 18, and an inturned marginal lip 20 extending entirely about the opening. The top and bottom walls 16, 18 of casing 12 are perfectly straight and parallel. The sides of casing 12 are bowed outwardly into semi-circular form.

At the front of cabinet 12, I secure a U-shaped trackway 30, which may be formed as by stamping, rolling or otherwise, of suitable light gauge metallic material. The securement to casing 12 may be by spot-welding same to lip 20, as at 32. The top and bottom of the trackway are perfectly straight, and the ends are curved outwardly to conform to the semi-circular curvature of the side walls of the cabinet.

Within trackway 30, I dispose a closure 40, which comprises a circular U-rim 42, within which may be mounted a mirror 44, and suitable backing elements as 46, 48. The height of trackway 30 is slightly greater than the diameter of closure 40, so that the circular closure 40 may be rolled back and forth within the trackway.

As seen in Fig. 1, casing 12 is more than twice as long as the diameter of the closure 40. Preferably, the length of the casing opening is at least twice the diameter of the closure, so that as the closure is rolled back and forth within trackway 30 across the open end of the casing, access may be had to all parts thereof.

The novel circular closure plate 40, and its rolling action in the plane of the opening into the cabinet saves space by eliminating the outswinging movement of a hinged closure, eliminates the necessity for hinges or other pivoting devices and thereby reduces costs. The device as a unit is simple and easy to construct and install. The circular shape of the closure permits rolling the plate back and forth within the trackway, and the semi-circular sides of the casing and trackway permit resting the closure plate at either end of the casing as desired.

Having now described my invention, what I claim and desire to secure by Letters Patent is:

An open-front cabinet and a partial closure therefor, the cabinet comprising a rear wall, horizontally disposed top and bottom walls, and a pair of side walls, the top and bottom walls being straight and parallel to each other, and the side walls being semi-circularly curved outwardly, the marginal edges of the top, bottom and side walls being inturned about the opening into the cabinet, a trackway U-shaped in cross-section surrounding the opening the inner side of which trackway is secured to the inturned marginal edges of the top, bottom and side walls, and the closure comprising a rollable circular plate within the trackway of diameter slightly less than the distance between the top and bottom walls and less than half the length of the cabinet, so that at least half the cabinet opening is always uncovered and ready access had thereinto.

DANIEL W. WITKIN.